United States Patent
Salla et al.

(10) Patent No.: US 10,876,044 B2
(45) Date of Patent: Dec. 29, 2020

(54) FORMATION OF MICRO-PROPPANT PARTICULATES IN SITU

(71) Applicant: Halliburton Energy Services, Inc., Houston, TX (US)

(72) Inventors: Rajender Salla, Pune (IN); Sairam Eluru, Pune (IN); Sumukh Deshprabhu, Pune (IN); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/462,881

(22) PCT Filed: Dec. 20, 2016

(86) PCT No.: PCT/US2016/067763
§ 371 (c)(1),
(2) Date: May 21, 2019

(87) PCT Pub. No.: WO2018/118024
PCT Pub. Date: Jun. 28, 2018

(65) Prior Publication Data
US 2020/0063022 A1 Feb. 27, 2020

(51) Int. Cl.
*C09K 8/80* (2006.01)
*E21B 43/267* (2006.01)
*C09K 8/66* (2006.01)

(52) U.S. Cl.
CPC ............... *C09K 8/80* (2013.01); *C09K 8/665* (2013.01); *E21B 43/267* (2013.01)

(58) Field of Classification Search
CPC ............................. C09K 8/80; E21B 43/267
See application file for complete search history.

(56) References Cited

U.S. PATENT DOCUMENTS

| | | | | |
|---|---|---|---|---|
| 3,097,694 A | * | 7/1963 | Kerver | C09K 8/665 166/280.1 |
| 3,593,796 A | * | 7/1971 | Stainback | C09K 8/572 166/288 |
| 8,474,532 B2 | * | 7/2013 | Ballard | C09K 8/58 166/300 |

(Continued)

FOREIGN PATENT DOCUMENTS

| | | | |
|---|---|---|---|
| WO | 2009085354 A1 | 7/2009 | |
| WO | 2015102580 A1 | 7/2015 | |
| WO | WO-2015102629 A1 * | 7/2015 | ............ C09K 8/92 |

OTHER PUBLICATIONS

Gorrepati, Elizabeth A. et al., Silica Precipitation in Acidic Solutions: Mechanism, pH Effect, and Salt Effect, Department of Chemical Engineering, University of Michigan, Langmuir 2010, 26(13), 10467-10474, Jun. 20, 2010.

*Primary Examiner* — Angela M DiTrani Leff
(74) *Attorney, Agent, or Firm* — McAfee & Taft (57) ABSTRACT

A method of fracturing a subterranean formation wherein a silicate component and a silica precipitation agent are each mixed with the fracturing fluid. The fracturing fluid is introduced to a subterranean formation such that the fracturing fluid is allowed to precipitate silica and form micro-proppant particulates in situ in a microfracture. The silicate component can be selected from potassium silicate, sodium silicate and combinations thereof.

21 Claims, 5 Drawing Sheets

(56) References Cited

U.S. PATENT DOCUMENTS

| | | | |
|---|---|---|---|
| 8,607,870 B2* | 12/2013 | Gu | E21B 43/267 |
| | | | 166/308.1 |
| 8,985,213 B2 | 3/2015 | Saini et al. | |
| 9,834,721 B2* | 12/2017 | Chang | C09K 8/602 |
| 9,869,619 B2* | 1/2018 | Weissleder | H01F 1/068 |
| 2008/0190614 A1* | 8/2008 | Ballard | C09K 8/032 |
| | | | 166/293 |
| 2012/0228545 A1 | 9/2012 | Ebert et al. | |
| 2013/0284437 A1* | 10/2013 | Nguyen | E21B 43/267 |
| | | | 166/280.1 |
| 2014/0034309 A1* | 2/2014 | Saini | E21B 43/267 |
| | | | 166/280.1 |
| 2014/0238673 A1* | 8/2014 | Nguyen | E21B 43/261 |
| | | | 166/278 |
| 2015/0060072 A1 | 3/2015 | Busby et al. | |
| 2015/0159074 A1* | 6/2015 | Luyster | C09K 8/03 |
| | | | 166/305.1 |
| 2016/0090525 A1* | 3/2016 | McDonald | C09K 8/032 |
| | | | 507/269 |

\* cited by examiner

FIG. 5

FORMATION OF MICRO-PROPPANT PARTICULATES IN SITU

BACKGROUND

In order to efficiently produce hydrocarbons from a subterranean formation, the formation must be sufficiently conductive in order to allow the hydrocarbons to flow to the wellbore. Various treatments for increasing the conductivity of a subterranean formation have been developed.

One technique for increasing the conductivity of a subterranean formation and thereby stimulating production of hydrocarbons from the formation is hydraulic fracturing. Hydraulic fracturing generally involves pumping one or more treatment fluids into the formation at a sufficient hydraulic pressure to create or enhance one or more fractures in the formation. Typically, a pad fracturing fluid that does not contain any proppant particulates is first injected into the formation to initially fracture the formation. Following injection of the pad fluid, a proppant slurry that includes a plurality of proppant particulates is then injected into the formation. The proppant slurry deposits the proppant particulates in the fracture and any branches thereof in order to prevent the fracture and the fracture branches from fully closing once the hydraulic pressure from the fluid is released and the fracturing operation is complete. The resulting "propped fracture" provides a conductive channel through which fluids in the formation can flow to the wellbore.

Fracturing tight formations of unconventional reservoirs, such as formations containing shale, tight sandstone formations and coal bed formations, requires special considerations. For example, shale, coal and other types of formations can have a permeability of approximately 1 millidarcy (mD) or less. Hydraulically fracturing such formations typically forms a complex fracture network that includes primary fractures (and branches thereof) and microfractures (including natural microfractures and induced secondary microfractures) in a zone of the formation surrounding the wellbore.

For example, the microfractures can extend from a tip and edges of a primary fracture or a branch thereof outwardly in a branching tree-like manner. The microfractures can extend transversely to the trajectory of the primary fractures allowing them to reach and link natural fractures both in and adjacent to the trajectory of the primary fractures. The microfractures can exist and be formed in both near-wellbore and far-field regions of the zone, as well as regions located adjacent to primary fracture branches. As a result, the microfractures can give more depth and breadth to the fracture network.

In the absence of sufficiently small proppant particulates, the microfractures tend to close back once the hydraulic pressure placed on the formation is released or decreased. Conventional or traditional proppant particulates (for example, having an average D50 particle size of at least 150 microns) are typically too large to prop the microfractures open. As a result, due to their size, conventional proppant particulates cannot be easily placed in microfractures. Allowing the microfractures to close cuts off a significant portion of the fracture network and ultimately prevents the production of valuable hydrocarbons therefrom.

In order to address this issue, micro-proppant particulates having a size sufficient to allow the particulates to be placed in microfractures have been developed. For example, micro-proppant particulates having a particle size of about 75 microns or less have been developed. For example, the micro-proppant particulates are included in the pad fluid stages of the fracturing treatment. Including micro-proppant particulates in the pad fluid places the micro-proppant particulates in the fissure openings to and otherwise in the microfractures as soon as they are opened or created. By holding the microfractures open, the micro-proppant particulates maintain fluid communication between the microfractures and the primary fractures. Conventional proppant particulates are then included in the proppant-slurry stages of the fracturing treatment and placed in the primary fractures and branches to help ensure that fluid conductive flow paths to the wellbore are maintained.

Micro-proppant particulates are typically placed in containers at a plant or other location that is remote from the well site and then shipped to the well site where the micro-proppant particulates are available for use when needed. In seine cases, the micro-proppant particulates are placed in containers and shipped in dry form. In other cases, the micro-proppant particulates are mixed with water to form an aqueous slurry of the micro-proppant particulates. The slurry is then placed in containers and shipped to the well site. The process of containing and shipping the micro-proppant particulates to the well site, whether the particulates are in dry or slurry form, adds to the cost of the micro-proppant particulates. Also, the process of mixing dry micro-proppant particulates with the pad fluid or other fracturing fluid on the well site can create a significant amount of problematic dust.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

DETAILED DESCRIPTION

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts may have been exaggerated to better illustrate details and features of the present disclosure.

In accordance with this disclosure, a method of fracturing a subterranean formation is provided. The method comprises the following steps:

providing a pad fracturing fluid, the pad fracturing fluid including an aqueous base carrier fluid;

mixing a silicate component with the pad fracturing fluid;

mixing a silica precipitation agent with the pad fracturing fluid;

pumping the pad fracturing fluid into the formation at a pressure above the fracture gradient of the formation to fracture the formation and form a fracture network therein that includes at least one primary fracture and at least one microfracture;

allowing the pad fracturing fluid to precipitate silica and form micro-proppant particulates in situ in the microfracture; and ceasing pumping of the pad fracturing fluid into the formation.

As used herein and in the appended claims, fracturing a subterranean formation and forming a fracture in a formation both mean forming a new fracture or expanding an existing fracture in some dimension in the formation. A "fracturing fluid" means a pad fracturing fluid, a proppant slurry or any other type of treatment fluid pumped into the subterranean formation in a hydraulic formation fracturing operation. A "pad fracturing fluid" means a fracturing fluid that does not include primary proppant particulates. A "proppant slurry" means a treatment fluid that includes primary proppant particulates.

As used herein and in the appended claims, the term "primary proppant particulates" means particulates having a D50 particle size distribution of greater than or equal to 150 microns. For example, the primary proppant particulates can have a D50 particle size distribution in the range of from about 150 microns to about 800 microns. For example, the primary proppant particulates can have a D50 particle size distribution in the range of from about 150 microns to about 500 microns. Apart from the above definition of primary proppant particulates, the modifier "primary" should not be construed as limiting.

As used herein and in the appended claims, the term "micro-proppant particulates" means particulates having a D50 particle size distribution of less than 150 microns. For example, the micro-proppant particulates can have a D50 particle size distribution of no greater than about 100 microns. For example, the micro-proppant particulates can have a D50 particle size distribution of no greater than about 75 microns. For example, the micro-proppant particulates can have a D50 particle size distribution in the range of from about 1 micron to about 50 microns. For example, the micro-proppant particulates can have a D50 particle size distribution in the range of from about 1 micron to about 20 microns. For example, the micro-proppant particulates can have a D50 particle size distribution in the range of from about 1 micron to about 10 microns. As used herein and in the appended claims, a "D50 particle size distribution" means the value of the particle diameter at 50% in the cumulative distribution. Apart from the above definition of micro-proppant particulates, the modifier "micro" should not be construed as limiting.

For example, the aqueous base carrier fluid of the pad fracturing fluid and/or other fracturing fluid used in the method disclosed herein can be water. The water can come from a variety of sources. For example, the water can be fresh water, saltwater (for example, water containing one or more salts dissolved therein), brine (for example, saturated saltwater or produced water), seawater, brackish water, produced water (for example, water produced from a subterranean formation), formation water, treated flowback water, and mixtures thereof. Generally, the water can be from any source, provided that it does not contain components that might adversely affect the stability and/or performance of the fracturing fluid.

The silicate component and the silica precipitation agent can each be mixed with the pad fracturing fluid by any method known to those skilled in the art with the benefit of this disclosure. For example, the silicate component and silica precipitation agent can first be mixed together with an aqueous solution to form a homogenous solids-forming liquid solution. The homogenous solids-forming solution can then be admixed with the pad fracturing fluid to make the pad fracturing fluid a homogenous solids-forming liquid solution. Alternatively, for example, the silicate component and silica precipitation agent can be mixed with the pad fracturing fluid on the fly as the pad fracturing fluid is pumped into the wellbore to make the pad fracturing fluid a homogenous solids-forming liquid solution. As used herein and in the appended claims, a homogenous liquid solution means a liquid mixture or solution of two or more components that has a uniform appearance and composition.

The silicate component and silica precipitation agent can be mixed with the pad fracturing fluid before or after the pad fracturing fluid is first pumped into the formation at a pressure above the fracture gradient of the formation to fracture the formation and form a fracture network therein. The silicate component and silica precipitation agent can be mixed with the pad fracturing fluid and pumped into the formation at the same time or at different times.

As used herein and in the appended claims, a silicate component means one or more silicate compounds or one or more compounds that generate one or more silicate compounds. A silicate compound means a compound that contains silicon, oxygen and one or more metals, with or without hydrogen. For example, the silicate component can be selected from the group of potassium silicate, sodium silicate, or a combination thereof. An example of a commercially available silicate-based solution (including sodium silicate and potassium silicate) that can be used is sold by Halliburton Energy Services, Inc. in association with the trademark GASCON™ The GASCON™ additive is available in various concentrations and varieties. For example, the silicate component can consist essentially of sodium silicate (for example, $Na_2OSiO_2$ or $2Na_2OSiO_2$).

For example, the silicate component can be added to the pad fracturing fluid in an amount in the range of from about 0.01% by volume to about 30% by volume based on the volume of the aqueous base carrier fluid. For example, the silicate component can be added to the pad fracturing fluid in an amount in the range of from about 0.1% by volume to about 20% by volume based on the volume of the aqueous base carrier fluid. For example, the silicate component can be added to the pad fracturing fluid in an amount in the range of from about 1% by volume to about 10% by volume based on the volume of the aqueous base carrier fluid.

Figure 5:
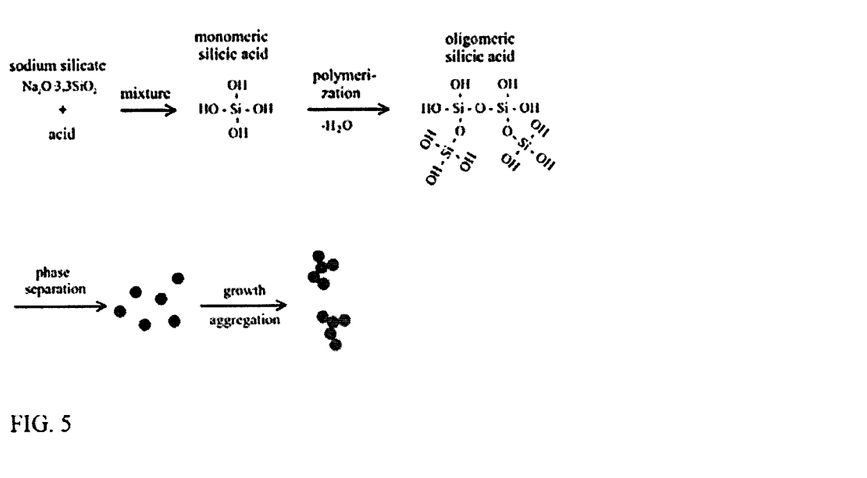
FIG. 5 is a diagram illustrating an example of a mechanism for the precipitation of silica from a silicate component.

As used herein and in the appended claims, a silica precipitation agent means one or more compounds that cause the silicate component to generate silica. Precipitation of silica by the silicate component can occur by various mechanisms. For example, the silicate component can react with one or more acids to form silicic acid which can in turn undergo polymerization and phase separation to produce silica particles. The silica particles then form silica particle agglomerates. The exact reaction mechanism can vary depending on the pH of the solution or carrier fluid containing the reagents, and whether divalent ions are added to the solution or carrier fluid. For example, a primary mechanism for the precipitation of silica from a silicate component is shown by FIG. 5.

For example, the silica precipitation agent can be selected from the group of a silane component, an acid component, and a combination thereof. As used herein and in the appended claims, a silane component means one or more silane compounds or one or more compounds that generate one or more silane compounds. As used herein and in the appended claims, an acid component means one or more acid compounds or one or more compounds that generate one or more acid compounds.

For example, the silica precipitation agent can consist essentially of a silane component. For example, the silane component can be selected from the group of epoxy-functional silane compounds, amino-functional silane compounds and any combination thereof. As used herein and in the appended claims, an epoxy-functional silane compound means a silane compound that includes a functional epoxy group. An amino-functional silane compound means a silane compound having a functional amino group. For example, the silane component can consist essentially of an epoxy-functional silane compound. For example, the silane component can consist essentially of 3-glycidyloxypropyl trimethoxysilane. Examples of commercially available epoxy-functional silane compounds and amino-functional silane compounds that can be used are sold by Halliburton Energy Services, Inc. in association with the trade designations FDP-S1129-14 (epoxy silane) and FDP-S1130-14 (amino silane).

For example, the silica precipitation agent can consist essentially of an acid component. For example, the acid component can consist essentially of one or more organic acid compounds or one or more compounds that generate one or more organic acid compounds. Organic acids tend to slowly reduce the pH of the pad fracturing fluid over a time period sufficient to allow the pad fracturing fluid to enter the microfracture before significant silica precipitation occurs. Inorganic acids, on the other hand, tend to rapidly reduce the pH of the pad fracturing fluid and cause significant silica precipitation before the pad fracturing fluid enters the microfracture. As a result, although the acid component can consist essentially of one or more inorganic acid compounds or one or more compounds that generate one or more inorganic acid compounds, a mechanism to delay or slow the reduction in pH of the pad fracturing fluid that is caused by the inorganic acid should be used in connection therewith.

For example, if an inorganic acid is used as the silica precipitation agent, or if it is otherwise necessary to delay or slow the reduction in pH of the pad fracturing fluid caused by the silica precipitation agent, a base such as a bicarbonate base or carbonate base can be also mixed with the pad fracturing fluid to delay or slow the reduction in the pH of the pad fracturing fluid for a time period sufficient to allow the pad fracturing fluid to enter the microfracture before significant silica precipitation occurs. As another example, the silica precipitation agent can be mixed with the pad fracturing fluid and placed in the microfracture before the silicate component is mixed with the pad fracturing fluid and placed in the microfracture such that the silica precipitation agent and silicate component do not come into contact with one another until they are in the microfracture.

For example, the acid component can consist essentially of a delayed acid generator. As used herein and in the appended claims, a delayed acid generator means a compound that releases acid over a time period of 0.1 to 10 hours beginning from the time it is first admixed with an aqueous solution or carrier fluid. For example, the delayed acid generator used herein can release acid over a time period of 0.25 hours to 5 hours beginning from the time the delayed acid generator is first admixed with an aqueous solution or carrier fluid. For example, the delayed acid generator used herein can release acid over a time period of 0.5 hours to 2 hours beginning from the time the delayed acid generator is first admixed with an aqueous solution or carrier fluid.

For example, the delayed acid generator(s) used herein can consist essentially of an organic acid ester. For example, the organic acid ester can be selected from the group of lactic acid esters, polylactic acids, and any combination thereof. For example, the organic acid ester can consist essentially of a lactic acid ester. For example, the organic acid ester can consist essentially of a polylactic acid. An example of a commercially available lactic acid ester that can be used is sold by Halliburton in association with the trademark N-FLOW™. The N-FLOW™ additive is available in various concentrations and varieties. For example, the delayed acid generator can slowly reduce the pH of the pad fracturing fluid to 4, which in turn slowly allows amorphous silica to precipitate. The rate at which the pH of the pad fracturing fluid is lowered by the delayed acid generator will vary depending on the temperature of the pad fracturing fluid. For example, generally the higher the downhole temperature the faster the release of acid by the delayed acid generator.

For example, the silica precipitation agent can be added to the pad fracturing fluid in an amount in the range of from about 0.01% by volume to about 30% by volume based on the volume of the aqueous base carrier fluid. For example, the silica precipitation agent can be added to the pad fracturing fluid in an amount in the range of from about 0.1% by volume to about 20% by volume based on the volume of the aqueous base carrier fluid. For example, the silica precipitation agent can be added to the pad fracturing fluid in an amount in the range of from about 1% by volume to about 10% by volume based on the volume of the aqueous base carrier fluid.

The pad fracturing fluid can be pumped into the formation at a pressure above the fracture gradient of the formation to fracture the formation and form the fracture network (including primary fractures and microfractures) therein in accordance with the disclosed method in any manner known to those skilled in the art of fracturing subterranean formations with the benefit of this disclosure. As used herein and in the appended claims, the fracture gradient of a formation means the minimum pressure required to create a new fracture or expand an existing fracture in some dimension in the formation.

As used herein and in the appended claims, forming a fracture network in the formation means forming a new fracture network or expanding an existing fracture network in some dimension in the formation. A "fracture network" means the access conduits, primary fractures, branches of primary fractures, microfractures and branches of microfractures, man-made, natural or otherwise, that are within a subterranean formation and in fluid communication with the wellbore. For example, the fracture network may be considered a dendritic fracture network, a shattered fracture network, or any combination thereof.

Figure 1:
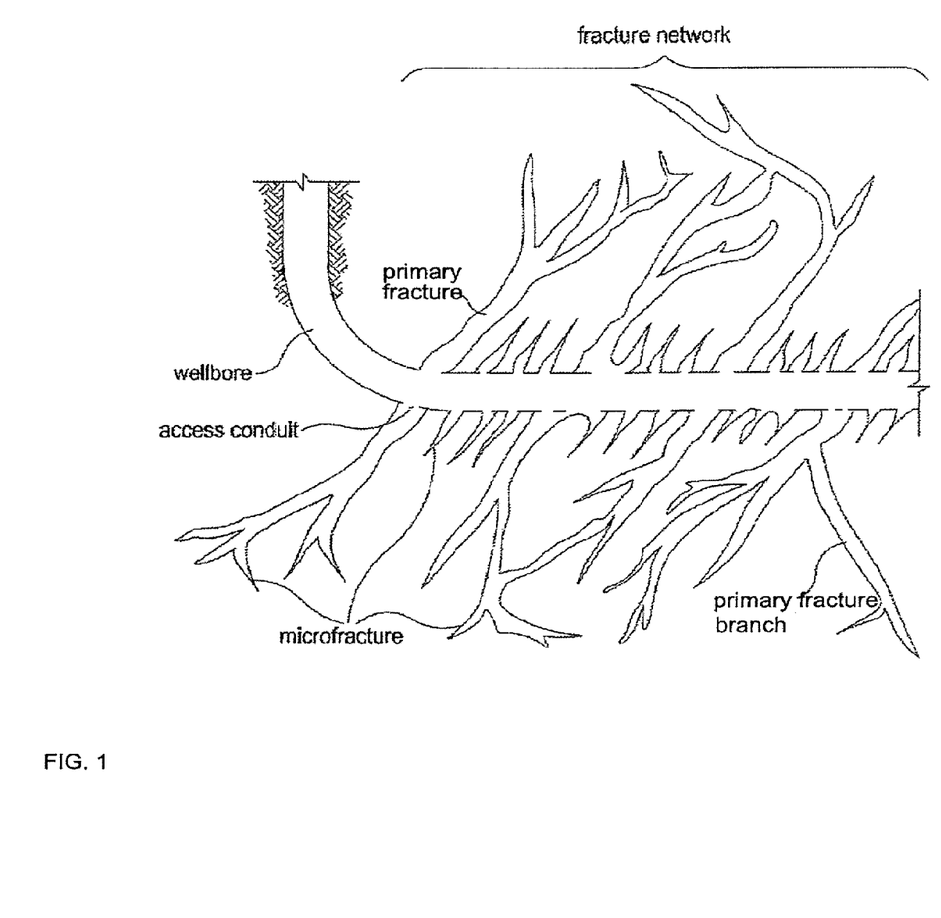
FIG. 1 illustrates a non-limiting example of a dendritic fracture network extending from a wellbore into a subterranean formation.
Figure 2:
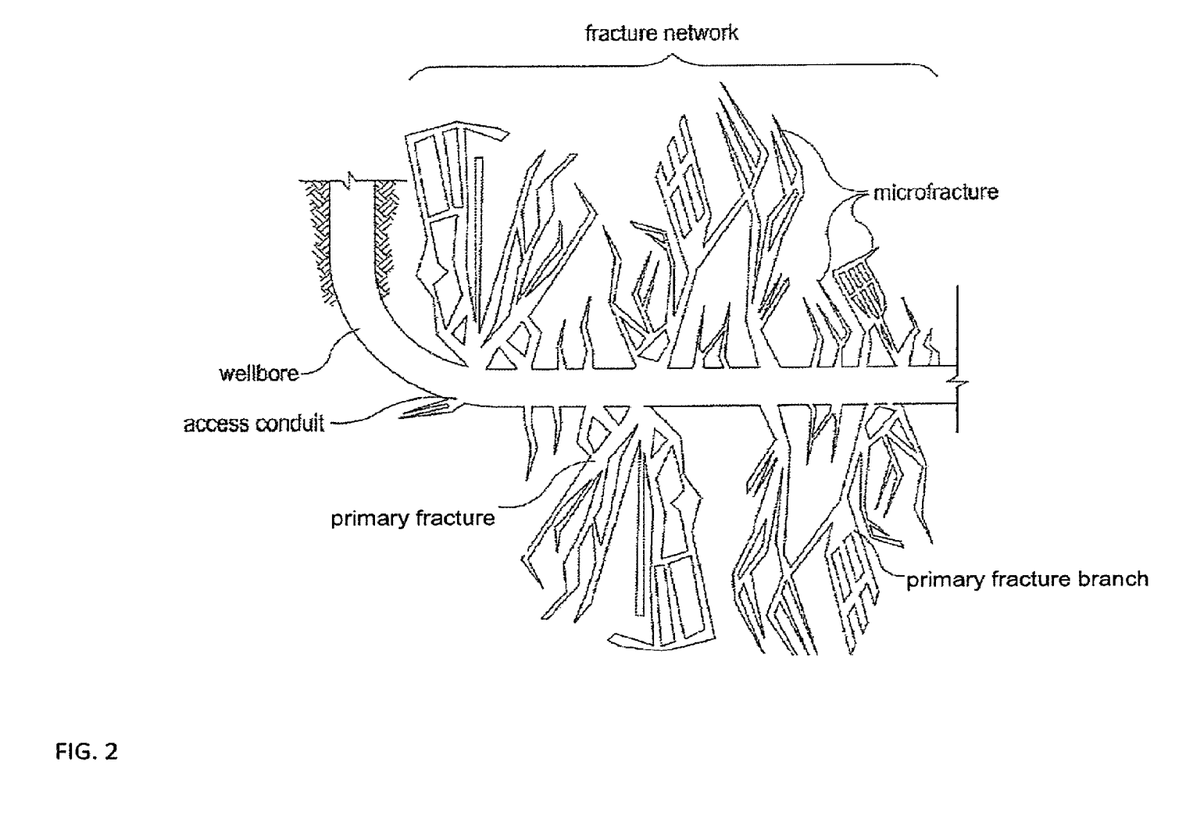
FIG. 2 illustrates a non-limiting example of a shattered fracture network extending from a wellbore into a subterranean formation.

FIG. 1 shows an example of a dendritic fracture network extending from a wellbore into a subterranean formation. FIG. 2 shows an example of a shattered fracture network extending from a wellbore into a subterranean formation. These non-limiting examples illustrate two common types of fracture networks extending from a wellbore. It should be understood that the method disclosed herein is applicable to wellbores at any angle including, but not limited to, vertical wells, deviated wells, highly deviated wells, horizontal wells, and hybrid wells that comprise sections of any combination of the aforementioned wells. For example, the disclosed method may be used in connection with a subterranean formation and wellbore having an existing fracture network.

As used herein and in the appended claims, a primary fracture means a fracture that extends from the wellbore and can be propped open using primary proppant particulates. The primary fracture can be a pre-existing primary fracture or a branch thereof or a new primary fracture or branch thereof that is created by the disclosed method. A microfracture means a natural fracture or an induced secondary fracture that extends from a primary fracture or a branch thereof and that cannot be propped open using primary proppant particulates. The microfracture can be a pre-existing or natural microfracture or a branch thereof or a new microfracture or branch thereof that is created by the disclosed method.

The fracture network is typically formed in a zone of the formation that surrounds the wellbore and propagates from at least one outlet conduit outwardly from the wellbore. Microfractures can exist and be formed in both near-wellbore and far-field regions of the zone, as well as regions located adjacent to branches of primary fractures.

The pad fracturing fluid can be allowed to precipitate silica and form micro-proppant particulates in the microfracture by pumping the pad fracturing fluid into the microfracture and allowing sufficient time for the silica precipitation to occur. The rate at which silica precipitation occurs is dependent on the temperature of the pad fracturing fluid. While in place, the micro-proppant particulates prop the microfractures of the fracture network open after pumping of the pad fracturing fluid into the formation has ceased, thereby enhancing the ability of fluid to flow through the fracture network to the wellbore.

For example, pumping of the pad fracturing fluid into the formation can be ceased by ceasing pumping of the pad fracturing fluid in its entirety into the formation. Alternatively, pumping of the pad fracturing fluid into the formation can be ceased by directly transforming the pad fracturing fluid into a different type of fracturing fluid (for example, a proppant slurry) without actually ceasing pumping of the aqueous base carrier fluid into the formation. Either way, it is important to pump the fracturing fluid into the formation at a sufficient rate to maintain the hydraulic pressure on the formation above the fracture gradient of the formation to keep the fractures open until the fracturing treatment is complete.

For example, the method disclosed herein can further comprise:

provbiding a proppant slurry, the proppant slurry including an aqueous base carrier fluid and a plurality of primary proppant particulates;

after the pad fracturing fluid is allowed to precipitate silica and form micro-proppant particulates in the microfracture, pumping the proppant slurry into the formation at a pressure above the fracture gradient of the formation to place primary proppant particulates in the primary fracture; and ceasing pumping of the proppant slurry into the formation.

A proppant slurry can be provided in accordance with the disclosed method in a number of ways. For example, the proppant slurry can be a separate fluid from, and come from a different source than, the pad fracturing fluid (for example, the proppant slurry and pad fracturing fluid can come from separate tanks). In this example, the amount of the pad fracturing fluid pumped into the formation can be slowly decreased until pumping of the pad fracturing fluid into the formation is ceased. At the same time, pumping of the proppant shiny can be initiated and the amount of the proppant slurry pumped into the formation can be slowly increased to the desired amount. This allows the transition from the pad fracturing fluid to the proppant slurry to be made while maintaining the hydraulic pressure on the formation above the fracture gradient of the formation. An example of when the proppant slurry can be a separate fluid from, and come from a different source than, the pad fracturing fluid is when the pad fracturing fluid contains a crosslinker to allow it to be crosslinked whereas the proppant slurry is a linear gel fluid. In a similar scenario, the pad fracturing fluid is a linear gel fluid and the proppant slurry contains a crosslinker to allow it to be crosslinked.

Alternatively, for example, mixing of the silicate component and mixing of the silica precipitation agent with the pad fracturing fluid can be ceased, and at the same time or some point thereafter primary proppant particulates can be mixed directly with the same aqueous base carrier fluid that is used to form the pad fracturing fluid, all while the pumping process continues. In this example, the pad fracturing fluid is directly transformed into a proppant slurry by adding primary proppant particulates thereto. In effect, mixing primary proppant particulates with the pad fracturing fluid constitutes ceasing pumping of the pad fracturing fluid into the formation, providing a proppant slurry that includes an aqueous base carrier fluid and a plurality of primary proppant particulates, and pumping the proppant slurry into the formation. Again, the transition from a pad fracturing fluid to a proppant slurry can be made without ceasing the pumping process or reducing the hydraulic pressure placed on the formation below the fracture gradient of the formation.

In both examples, the primary proppant particulates can be mixed with the aqueous base carrier fluid on the fly as the fracturing fluid is pumped into the wellbore and the fracturing treatment is carried out. For example, the primary proppant particulates can be incorporated into a slurry that is atomized into an aqueous base carrier fluid, as appropriate, on the fly as the fracturing fluid is pumped into the wellbore.

For example, steps can be taken to minimize or prevent mixing of the silicate component and silica precipitation agent with the proppant slurry, which can cause silica to precipitate in the primary fracture and reduce the conductivity thereof. Allowing micro-proppant particulates to form in the primary fracture can choke off the conductivity of a proppant pack formed in the primary fracture.

For example, mixing a silicate component and mixing a silica precipitation agent with the pad fracturing fluid can be ceased before pumping the pad fracturing fluid into the formation is ceased, and before pumping a proppant slurry into the formation (either from a different source or by adding primary proppant particulates directly to the pad fracturing fluid) is initiated. Pumping of the pad fracturing fluid into the formation can be continued after mixing of a silicate component and mixing of a silica precipitation agent with the pad fracturing fluid has ceased and before pumping a proppant slurry into the formation is initiated for a time period sufficient to flush at least most of the silicate component and silica precipitation agent out of the primary fracture.

In carrying out the method disclosed herein, the fracturing fluids, including the pad fracturing fluid and the proppant slurry, can be pumped through the wellbore and through one or more access conduits into the formation. As used herein and in the appended claims, an "access conduit" refers to a passageway that provides fluid communication between the wellbore and the subterranean formation, which may include, but is not limited to, sliding sleeves, open holes (for example, in non-cased areas), hydrajetted holes, perforations (for example, in cased areas), and the like.

For example, the pad fracturing fluid can be pumped into the formation in stages. The silicate component and silane precipitation agent can each be mixed with the pad fracturing fluid in accordance with the disclosed method in any one or all of the stages. For example, the silicate component and silane precipitation agent can each be mixed with the pad fracturing fluid in the initial stage of pumping the pad fracturing fluid into the formation, that is, before the pad fracturing fluid first fractures the formation and forms the fracture network therein. Alternatively, the silicate component and silane precipitation agent can each be first mixed with the pad fracturing fluid in a subsequent stage of pumping the pad fracturing fluid into the formation, that is, after the pad fracturing fluid first fractures the formation and forms the fracture network therein.

The proppant slurry can be pumped into the formation at a pressure above the fracture gradient of the formation to place primary proppant particulates in the primary fracture in accordance with the disclosed method in any manner known to those skilled in the art of fracturing subterranean formations. The primary proppant particulates are placed in the primary fracture by pumping the proppant slurry into the formation. For example, due to the hydraulic pressure placed on the formation during the fracturing treatment, the proppant slurry is forced into the primary fracture including any branches thereof. The primary proppant particulates prop the primary fracture(s) and primary fracture branches of the fracture network open after pumping of the fracturing fluid has ceased, thereby maintaining the ability for fluid to flow through the fracture network to the wellbore. The proppant slurry can also be pumped into the formation in stages.

For example, ceasing pumping of the proppant slurry and any other fracturing fluid into the formation in accordance with the disclosed method causes the pressure at which the proppant slurry is pumped into the formation to fall below the fracture gradient of the formation. Once the pressure in the formation falls below the fracture gradient of the formation, the primary fracture and any branches thereof tend to close on top of the primary proppant particulates therein. Similarly, the microfracture(s) and any microfracture branches in the fracture network tend to close on top of the micro-proppant particulates formed in situ therein. In this manner, the primary proppant particulates and micro-proppant particulates facilitate the flow of hydrocarbons through the fracture network to the wellbore and ultimately to the surface where they can be recovered.

The primary proppant particulates used in the disclosed method can be any type of proppant particulate suitable for use in propping open primary fractures and branches thereof in subterranean formations as known to those skilled in the art. Suitable primary proppant particulates include all shapes of materials, including substantially spherical materials, low to high aspect ratio materials, fibrous materials, polygonal materials (such as cubic materials), and mixtures thereof.

Examples of primary proppant particulates that can be used include sand (for example natural sand), bauxite, ceramic proppant materials, glass materials, polymer materials, polytetrafluoroethylene materials, fly ash, silica flour, seed shell pieces, fruit pit pieces, composite particulates including wood composite particulates, nut shell pieces including walnut hulls (for example, ground walnut hulls), resin pre-coated proppant particulates such as resin pre-coated sand, man-made non-degradable proppant particulates, and mixtures thereof. Examples of man-made primary proppant particulates include bauxite, ceramics, and polymeric composite particulates. Suitable composite particulates include a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

For example, the primary proppant particulates can be selected from the group of sand, walnut hulls, resin pre-coated proppant particulates, man-made proppant particulates, and mixtures thereof. For example, the primary proppant particulates of the aqueous based proppant slurry disclosed herein can be natural sand.

For example, the primary proppant particulates can be mixed with the fracturing fluid in an amount in the range of from about 0.01 pounds to about 6 pounds per gallon of the slurry. For example, the primary proppant particulates can be mixed with the fracturing fluid in an amount in the range of from about 0.01 pounds to about 1 pound per gallon of the slurry. For example, primary proppant particulates can be mixed with the fracturing fluid in an amount in the range of from about 0.025 pounds to about 0.1 pounds per gallon of the slurry.

As known to those skilled in the art with the benefit of this disclosure, various additional components and additives can be included in the fracturing fluid, including the pad fracturing fluid and proppant slurry, in order to, for example, reduce pumping friction, make it easier to pump the fluids through the wellbore and into the formation, reduce or eliminate the fluid's reaction to the formation, enhance the ability of the fluids to fracture the formation and keep the fractures open during and following the fracturing treatment, enhance the ability of the proppant slurry to place primary proppant particulates in the primary fractures, and make it easier to remove the fluids and any broken down gels and the like from the formation once the fracturing treatment is complete.

Additional additives that can be included in the fracturing fluid, including the pad fracturing fluid and proppant slurry, used in the disclosed method include, but are not limited to, friction reducing agents, gelling agents, foaming agents, crosslinking agents, gel breakers, consolidating agents, hydrocarbon fluids, air, salts, weighting agents, inert solids, fluid loss control agents, emulsifiers, dispersion aids, corrosion inhibitors, emulsion thinners, emulsion thickeners, viscosifying agents, surfactants, lost circulation materials, pH control additives, breakers, biocides, stabilizers, chelating agents, scale inhibitors, mutual solvents, oxidizers, reducers, clay stabilizing agents, and any combination thereof. For example, it may be advantageous to include a clay stabilizing agent in the fracturing fluid, including the pad fracturing fluid and/or proppant slurry, in order to minimize clay swelling.

Although the disclosed method can be used in any subterranean formation capable of being fractured, it is particularly suitable for use in connection with formations in which the microfractures have a greater tendency to form. For example, such formations include, but are not limited to, formations in which at least a portion of the formation is characterized by very low permeability, very low formation pore throat size, high closure pressure, high brittleness index, or any combination thereof.

For example, at least a portion of the subterranean formation may have a permeability ranging from a lower limit of about 0.1 nanodarcy (nD), 1 nD, 10 nD, 25 nD, 50 nD, 100 nD, or 500 nD to an upper limit of about 1000 microdarcies (mD), 500 mD, 100 mD, 10 mD, or 1 mD, and wherein the permeability may range from any lower limit to any upper limit and encompass any subset therebetween. For example, at least a portion of the subterranean formation may have a permeability of no greater than 1 mD. One method to determine the subterranean formation permeability includes The American Petroleum Institute Recommended Practice 40, "Recommended Practices for Core Analysis," Second Edition, February 1998.

For example, at least a portion of the subterranean formation may have an average formation pore throat size ranging from a lower limit of about 0.005 microns, 0.01 microns, 0.05 microns, 0.1 microns, 0.25 microns, or 0.5 microns to an upper limit of about 2.0 microns, 1.5 microns, 1.0 microns, or 0.5 microns, and wherein the average formation pore throat size may range from any lower limit to any upper limit and encompass any subset therebetween. One method to determine the pore throat size of a subterranean formation includes the AAPG Bulletin, March 2009, v. 93, no. 3, pages 329-340.

For example, at least a portion of the subterranean formation may have a closure pressure greater than about 500 psi to an unlimited upper limit. While the closure pressure upper limit is believed to be unlimited, formations where the disclosed method may be applicable include formations with a closure pressure ranging from a lower limit of about 500 psi, 1000 psi, 1500 psi, or 2500 psi to an upper limit of about 20,000 psi, 15,000 psi, 10,000 psi, 8500 psi, or 5000 psi, and wherein the closure pressure may range from any lower limit to any upper limit and encompass any subset therebetween. One method to determine the subterranean formation closure pressure includes the method presented in Society for Petroleum Engineers paper number 60321 entitled "Case History: Observations From Diagnostic Injection Tests in Multiple Pay Sands of the Matron Creek Field, Piceance Basin, Colo."

For example, at least a portion of a subterranean formation may have a brittleness index ranging from a lower limit of about 5, 10, 20, 30, 40, or 50 to an upper limit of about 150, 125, 100, or 75 and wherein the brittleness index may range from any lower limit to any upper limit and encompass any subset therebetween. Brittleness is a composite of Poisson's ratio and Young's modulus. One method to determine the brittleness index of a subterranean formation includes the method presented in Society for Petroleum Engineers paper number 132,990 titled "Petrophysical Evaluation of Enhancing Hydraulic Stimulation in Horizontal Shale Gas Wells."

The method disclosed herein is particularly suitable for fracturing tight formations of unconventional reservoirs, such as formations containing shale, tight sandstone formations, coal bed formations and other formations that encounter high closure stresses. For example, the method disclosed herein can be used to fracture a shale zone of a subterranean formation.

For example, all or part of the wellbore penetrating the subterranean formation may include casing pipes or strings placed in the wellbore (a "cased hole" or a "partially cased hole") in order to, for example, facilitate production of fluids out of the formation and through the wellbore to the surface. For example, the wellbore may also be an "open hole" that has no casing.

In accordance with the disclosed method, complex fracture networks, including primary fractures, microfractures and branches, can be effectively propped with proppant particulates to enhance the amount of hydrocarbons that can be produced from a subterranean formation after a fracturing treatment is complete. For example, the method helps ensure that microfractures and openings thereof (natural microfractures and induced microfractures) in both the near-wellbore and far-field regions of tight formations that interconnect with the primary fractures are effectively propped open.

For example, the initial liquid state of the solids-forming homogenous fracturing fluid allows the fracturing fluid to access microfractures without being limited by particulates and the particle sizes thereof. The ability to form micro-proppant particulate in situ eliminates problems caused by dust blowing at the well site. The use of liquid reagents to form the homogenous solids-forming solution and/or pad fracturing fluid eliminates the need to pre-mix micro-proppant particulates in containers and ship the containers to the well site.

For example, in one embodiment, the method of fracturing a subterranean formation disclosed herein comprises:

providing a pad fracturing fluid, the pad fracturing fluid including an aqueous base carrier fluid;

mixing a silicate component with the pad fracturing fluid, wherein the silicate component is selected from the group of potassium silicate, sodium silicate, or a combination thereof;

mixing a silica precipitation agent with the pad fracturing fluid, wherein the silica precipitation agent is selected from the group of a silane component, an acid component, and a combination thereof;

pumping the pad fracturing fluid into the formation at a pressure above the fracture gradient of the formation to fracture the formation and form a fracture network therein that includes at least one primary fracture and at least one microfracture;

allowing the pad fracturing fluid to precipitate silica and form micro-proppant particulates in the microfracture, wherein the micro-proppant particulates have a D50 particle size distribution of no greater than about 100 microns; and ceasing pumping of the pad fracturing fluid into the formation.

For example, in another embodiment, the method of fracturing a subterranean formation disclosed herein comprises:

providing a pad fracturing fluid, the pad fracturing fluid including an aqueous base carrier fluid;

mixing a silicate component with the pad fracturing fluid;

mixing a silica precipitation agent with the pad fracturing fluid;

pumping the pad fracturing fluid into the formation at a pressure above the fracture gradient of the formation to fracture the formation and form a fracture network therein that includes at least one primary fracture and at least one microfracture;

allowing the pad fracturing fluid to precipitate silica and form micro-proppant particulates in the microfracture;

ceasing pumping of the pad fracturing fluid into the formation;

providing a proppant slurry, the proppant slurry including an aqueous base carrier fluid;

after pumping of the pad fracturing fluid is ceased and after the pad fracturing fluid is allowed to precipitate silica and form micro-proppant particulates in the microfracture:

pumping the proppant slurry into the formation at a pressure above the fracture gradient of the formation to place primary proppant particulates in the primary fracture; and     ceasing pumping of the proppant slurry into the formation.

For example, in yet another embodiment, the method of fracturing a subterranean formation disclosed herein comprises:

providing a pad fracturing fluid, the pad fracturing fluid including an aqueous base carrier fluid;

mixing a silicate component with the pad fracturing fluid, wherein the silicate component is selected from the group of potassium silicate, sodium silicate, or a combination thereof;

mixing a silica precipitation agent with the pad fracturing fluid, wherein the silica precipitation agent is selected from the group of a silane component, an acid component, and a combination thereof;

pumping the pad fracturing fluid into the formation at a pressure above the fracture gradient of the formation to fracture the formation and form a fracture network therein that includes at least one primary fracture and at least one microfracture;

allowing the pad fracturing fluid to precipitate silica and form micro-proppant particulates in the microfracture wherein the micro-proppant particulates have a D50 particle size distribution of no greater than about 100 microns;

ceasing pumping of the pad fracturing fluid into the formation;

providing a proppant slurry, the proppant slurry including an aqueous base carrier fluid;

after pumping of the pad fracturing fluid is ceased and after the pad fracturing fluid is allowed to precipitate silica and form micro-proppant particulates in the microfracture:

pumping the proppant slurry into the formation at a pressure above the fracture gradient of the formation to place primary proppant particulates in the primary fracture; and     ceasing pumping of the proppant slurry into the formation.

Figure 3:
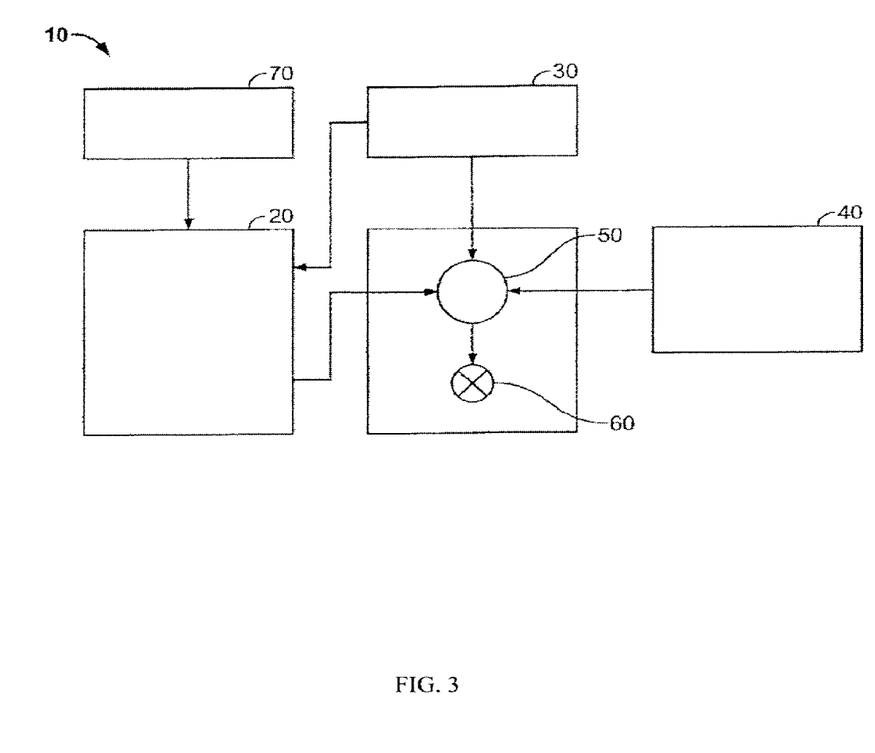
FIG. 3 is a diagram illustrating an example of a fracturing system that can be used in accordance with certain embodiments of the present disclosure.
Figure 4:
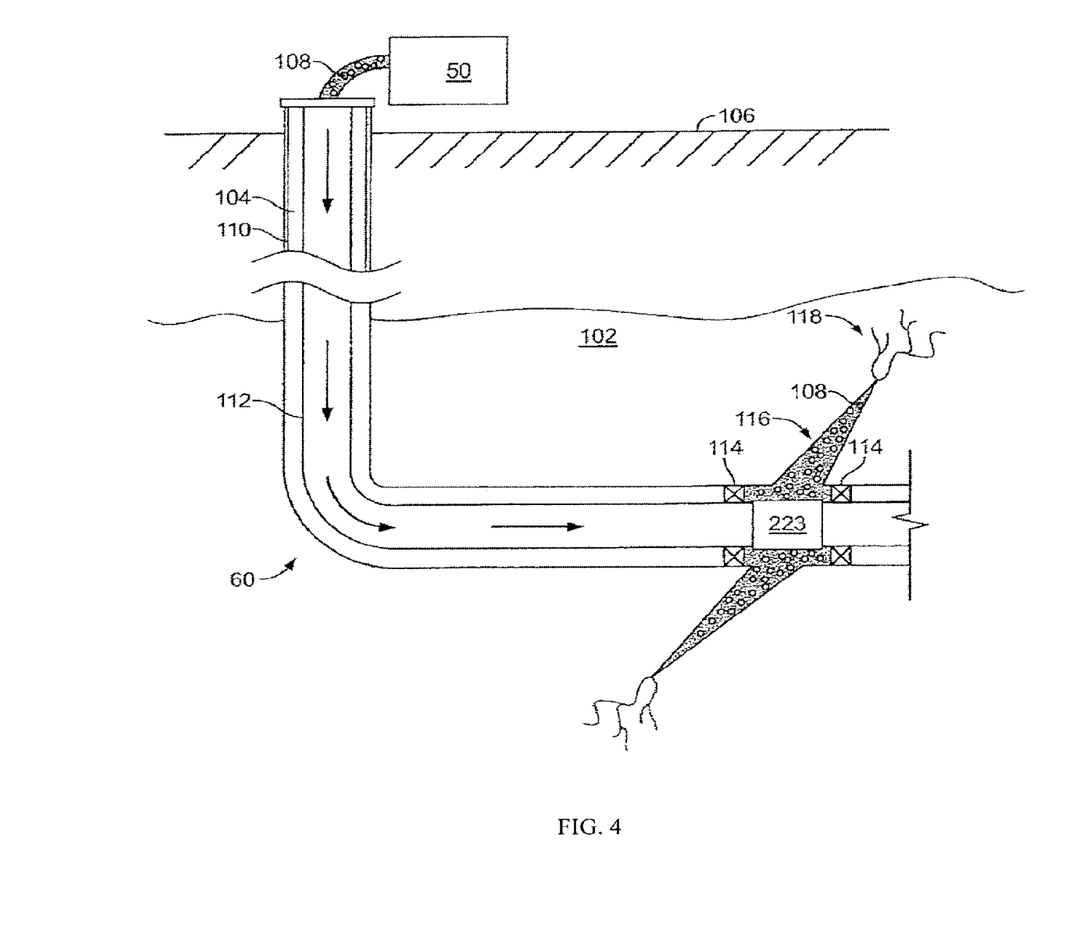
FIG. 4 is a diagram illustrating an example of a subterranean formation in which a fracturing operation can be performed in accordance with certain embodiments of the present disclosure.

The exemplary fluids, compositions and methods disclosed herein may directly or indirectly affect one or more components or pieces of equipment associated with the preparation, delivery, recapture, recycling, reuse, and/or disposal of the disclosed fluids, compositions and methods. FIGS. 3 and 4 illustrate a typical fracturing operation.

For example, and with reference to FIG. 3, the disclosed fluids, compositions and methods may directly or indirectly affect one or more components or pieces of equipment associated with an exemplary fracturing system 10, according to one or more embodiments. In certain instances, the system 10 includes a fracturing fluid producing apparatus 20 (for example, for producing the pad fracturing fluid and proppant slurry used in the disclosed method), a fluid source 30, a proppant source 40, and a pump and blender system 50. The system 10 resides at the surface at a well site where a well 60 is located. For example, the fracturing fluid producing apparatus 20 can combine a gel precursor with fluid (e.g., liquid or substantially liquid) from fluid source 30, to produce a hydrated fracturing fluid (for example, the pad fluid and/or proppant slurry of the method disclosed herein) that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, as discussed above, the fracturing fluid may comprise water, a hydrocarbon fluid, a polymer gel, foam, air, wet gases and/or other fluids.

The proppant source 40 can include and provide the proppant (including the micro-proppant particulates and primary proppant particulates of the disclosed method) for combination with the fracturing fluid (for example, the pad fluid and proppant slurry) as appropriate. The system may also include an additive source 70 that provides one or more additives (e.g., gelling agents, weighting agents, and/or other optional additives as discussed above) to alter the properties of the fracturing fluid (for example, the pad fluid and/or proppant slurry). For example, additives from the additive source 70 can be included to reduce pumping friction, to reduce or eliminate the fluid's reaction to the geological formation in which the well is limed, to operate as surfactants, and/or to serve other functions.

For example, the pump and blender system 50 can receive the fracturing fluid (for example, the base carrier fluid) and combine it with other components, including proppant particulates from the proppant source 40 and/or additional fluid from the additive source 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppant particulates, and/or other compositions to the pump and blender system 50. Such metering devices may permit the pump and blender system 50 to source from one, some or all of the different sources at a given time, and may facilitate the preparation of fracturing fluids in accordance with the present disclosure using continuous mixing or "on the fly" methods. Thus, for example, the pump and blender system 50 can provide just fracturing fluid (for example, the pad fluid) into the well at some times, just proppant slurry at some times, just proppant particulates at other times, and combinations of those components at yet other times.

FIG. 4 shows the well 60 during a fracturing operation in a portion of a subterranean formation of interest 102 (for example, a subterranean zone) surrounding a wellbore 104. For example, the formation of interest can include one or more subterranean formations or a portion of a subterranean formation.

The wellbore 104 extends from the surface 106, and the fracturing fluid 108 (for example, the pad fluid and proppant slurry) is applied to a portion of the subterranean formation 102 surrounding the horizontal portion of the wellbore.

Although shown as vertical deviating to horizontal, the wellbore 104 may include horizontal, vertical, slanted, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro-jetting and/or other tools.

The well is shown with a work string 112 depending from the surface 106 into the wellbore 104. The pump and blender system 50 is coupled to a work string 112 to pump the fracturing fluid 108 into the wellbore 104. The work string 112 may include coiled tubing, jointed pipe, and/or other structures that allow fluid to flow into the wellbore 104. The work string 112 can include flow control devices, bypass valves, ports, and/or other tools or well devices that control a flow of fluid from the interior of the work string 112 into the subterranean zone 102. For example, the work string 112 may include ports adjacent the wellbore wall to communicate the fracturing fluid 108 directly into the subterranean formation 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 4 shows two packers 114, one defining an uphole boundary of the interval and one defining the downhole end of the interval.

When the fracturing fluid 108 (for example, the pad fracturing fluid) is introduced into wellbore 104 (e.g., in FIG. 4, the area of the wellbore 104 between packers 114) at a sufficient hydraulic pressure, one or more primary fractures 116 and microfractures 118 are created in the subterranean zone 102. As shown, the microfractures have propagated from or near the ends and edges of the primary fractures 116. The primary proppant particulates in the fracturing fluid 108 (for example, the proppant slurry) enter the fractures 116 where they may remain after the fracturing fluid flows out of the wellbore, as described above. These primary proppant particulates may "prop" fractures 116 such that fluids may flow more freely through the fractures 116. Similarly, the micro-proppant particulates in the fracturing fluid 108 (for example, the pad fluid and the proppant slurry) enter the fractures 118 where they may remain after the fracturing fluid flows out of the wellbore, as described above. The primary proppant particulates and micro-proppant particulates "prop" fractures 116 and 118, respectively, such that fluids may flow more freely through the fractures 116 and 118.

While not specifically illustrated herein, the disclosed fluids, compositions and methods may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

The following examples illustrate specific embodiments consistent with the present disclosure but do not limit the scope of the disclosure or the appended claims. Concentrations and percentages are by weight unless otherwise indicated.

Example 1—In Situ Micro-proppant Particulate Formation

Method A: A sodium silicate and potassium silicate solution (sold by Halliburton Energy Services, Inc. in association with the trademark GASCON™ 469) was mixed with 3-glycidyloxypropyl trimethoxysilane (GPTMS) to form a homogenous solids-forming solution. The homogenous solids-forming solution was placed in a 200° F. water bath for 3 hours.

Method B: A sodium silicate and potassium silicate solution (sold by Halliburton in association with the trademark GASCON™ 469) was mixed with a lactic acid ester (sold by Halliburton in association with the trademark N-FLOW™ 325) to form a homogenous solids-forming solution. The homogenous solids-forming solution was placed in a 200° F. water bath for 1 hour.

In each test method, once the water bath was complete, the corresponding homogenous solids-forming solution was examined under a microscope (at 20 μm and 50 μm scales) and compared to fly ash particulates having known particle sizes under a microscope (at 20 μm and 50 μm scale, respectively). It was determined that in each solution, amorphous silica having a D50 particle size of about 10 microns had formed.

Example 2—Permeability Tests

Next, the permeabilities of split shale cores, one used as a control and one containing the silica micro-proppant particulate formed by Method A of Example 1, were compared. The split shale cores were subjected to core flow testing with nitrogen gas to determine core permeability. In each test, the corresponding core was installed in a Hassler sleeve. The confining pressure on the core was gradually increased to 1000 psi. Permeability measurements were determined and tabulated as below.

TABLE 1

| S. No | Initial permeability (Split core) | Final permeability with micro-proppant |
|---|---|---|
| 1 | 2.12 mD | 4.89 mD |

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of fracturing a subterranean formation, comprising:
providing a pad fracturing fluid, said pad fracturing fluid including an aqueous base carrier fluid;
mixing a silicate component and a silica precipitation agent with said pad fracturing fluid to form a homogenous liquid solution, wherein said silicate component is selected from the group of potassium silicate, sodium silicate, or a combination thereof, and wherein said silica precipitation agent is selected from the group of a silane component, an acid component, and a combination thereof;
pumping said homogenous liquid solution into the formation at a pressure above the fracture gradient of the formation to fracture the formation and form a fracture network therein that includes at least one primary fracture and at least one microfracture;
allowing said homogenous liquid solution to precipitate silica and form micro-proppant particulates in said microfracture; and
ceasing pumping of said homogenous liquid solution into said formation.

2. The method of claim 1, wherein said silicate component consists essentially of sodium silicate.

3. The method of claim 1, wherein said silicate component is added to said pad fracturing fluid in an amount in the range of from about 0.01% by volume to about 30% by volume based on the volume of the aqueous base carrier fluid.

4. The method of claim 1, wherein said silica precipitation agent consists essentially of a silane component.

5. The method of claim 4, wherein said silane component is selected from the group of epoxy-functional silane compounds, amino-functional silane compounds and any combination thereof.

6. The method of claim 5, wherein said silane component consists essentially of an epoxy-functional silane compound.

7. The method of claim 4, wherein said silane component consists essentially of 3-glycidyloxypropyl trimethoxysilane.

8. The method of claim 1, wherein said silica precipitation agent consists essentially of an acid component.

9. The method of claim 8, wherein said acid component consists essentially of one or more organic acid compounds or one or more compounds that generate one or more organic acid compounds.

10. The method of claim 8, wherein said acid component consists essentially of a delayed acid generator.

11. The method of claim 10, wherein said delayed acid generator consists essentially of an organic acid ester.

12. The method of claim 11, wherein said organic acid ester is selected from the group of lactic acid esters, polylactic acids, and any combination thereof.

13. The method of claim 1, wherein said silica precipitation agent is added to said pad fracturing fluid in an amount in the range of from about 0.01% by volume to about 30% by volume based on the volume of the aqueous base carrier fluid.

14. The method of claim 1, wherein said micro-proppant particulates have a D50 particle size distribution of no greater than about 100 microns.

15. The method of claim 14, wherein said micro-proppant particulates have a D50 particle size distribution in the range of from about 1 micron to about 50 microns.

16. The method of claim 15, wherein said micro-proppant particulates have a D50 particle size distribution of about 1 to about 10 microns.

17. The method of claim 1, further comprising:
providing a proppant slurry, said proppant slurry including an aqueous base carrier fluid and primary proppant particulates;
after said homogenous liquid solution is allowed to precipitate silica and form micro-proppant particulates in said microfracture, pumping said proppant slurry into the formation at a pressure above the fracture gradient of the formation to place the primary proppant particulates in the primary fracture; and
ceasing pumping of the proppant slurry into the formation.

18. A method of fracturing a subterranean formation, comprising:
providing a pad fracturing fluid, said pad fracturing fluid including an aqueous base carrier fluid;
mixing a silicate component and a silica precipitation agent with said pad fracturing fluid to form a homogenous liquid solution, wherein said silicate component is selected from the group of potassium silicate, sodium silicate, or a combination thereof, and wherein said silica precipitation agent is selected from the group of a silane component, an acid component, and a combination thereof;
pumping said homogenous liquid solution into the formation at a pressure above the fracture gradient of the formation to fracture the formation and form a fracture network therein that includes at least one primary fracture and at least one microfracture;
allowing said homogenous liquid solution to precipitate silica and form micro-proppant particulates in said microfracture; and
ceasing pumping of said homogenous liquid solution into the formation;
providing a proppant slurry, said proppant slurry including an aqueous base carrier fluid and primary proppant particulates;
after pumping of said homogenous liquid solution is ceased and after the homogenous liquid solution is allowed to precipitate silica and form micro-proppant particulates in the microfracture;
pumping said proppant slurry into the formation at a pressure above the fracture gradient of the formation to place the primary proppant particulates in said primary fracture; and
ceasing pumping of the proppant slurry into the formation.

19. A method of fracturing a subterranean formation, comprising:
- providing a pad fracturing fluid, said pad fracturing fluid including an aqueous base carrier fluid;
- mixing a silicate component and a silica precipitation agent with said pad fracturing fluid to form a homogeneous liquid solution, wherein said silicate component is selected from the group of potassium silicate, sodium silicate, or a combination thereof, and wherein said silica precipitation agent is selected from the group of a silane component, an acid component, and a combination thereof;
- pumping said homogenous liquid solution into the formation at a pressure above the fracture gradient of the formation to fracture the formation and form a fracture network therein that includes at least one primary fracture and at least one microfracture;
- allowing said homogeneous liquid solution to precipitate silica and form micro-proppant particulates in the microfracture, wherein the micro-proppant particulates have a D50 particle size distribution of no greater than about 100 microns;
- ceasing pumping of said homogeneous liquid solution into the formation;
- providing a proppant slurry, said proppant slurry including an aqueous base carrier fluid and primary proppant particulates;
- after pumping of said homogenous liquid solution is ceased and after said homogeneous liquid solution is allowed to precipitate silica and form micro-proppant particulates in said microfracture;
- pumping said proppant slurry into the formation at a pressure above the fracture gradient of the formation to place the primary proppant particulates in said primary fracture; and
- ceasing pumping of the proppant slurry into the formation.

20. The method of claim 19, wherein said subterranean formation includes at least one portion that has a permeability no greater than 1 mD.

21. The method of claim 19, wherein said silicate component and silica precipitation agent are mixed with said pad fracturing fluid using mixing equipment.

* * * * *

UNITED STATES PATENT AND TRADEMARK OFFICE
CERTIFICATE OF CORRECTION

PATENT NO. : 10,876,044 B2　　　　　　　　　　　　　　　　　　　　　　　　　Page 1 of 1
APPLICATION NO. : 16/462881
DATED : December 29, 2020
INVENTOR(S) : Rajender Salla et al.

It is certified that error appears in the above-identified patent and that said Letters Patent is hereby corrected as shown below:

In the Specification

Column 4, Line 52, delete "Ilalliburton" and replace with --Halliburton--

Column 4, Line 53, insert a --.-- after GASCON™

Column 5, Line 38, delete "Ilalliburton" and replace with --Halliburton--

Column 6, Line 28, delete "Ilalliburton" and replace with --Halliburton--

Column 14, Line 33, delete "limed" and replace with --formed--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*